June 4, 1968   R. F. POST   3,387,174
METHOD AND APPARATUS FOR REMOVING IMPURITY GAS
PARTICLES FROM A PARTICLE BEAM
Filed July 18, 1967

INVENTOR.
RICHARD F. POST
BY
ATTORNEY

United States Patent Office 3,387,174
Patented June 4, 1968

3,387,174
METHOD AND APPARATUS FOR REMOVING IMPURITY GAS PARTICLES FROM A PARTICLE BEAM
Richard F. Post, Walnut Creek, Calif., assignor to the United States of America as represented by the United States Atomic Energy Commission
Filed July 18, 1967, Ser. No. 654,281
9 Claims. (Cl. 315—111)

ABSTRACT OF THE DISCLOSURE

Apparatus for deflecting slow thermal energy particles from an energetic neutral particle beam. Electromagnetic energy strongly absorbed by slow particles moving with a beam is directed across the beam to impart a transverse energy component to the slow particles, deflecting them from the beam, hereby yielding a purified energetic neutral particle beam for use, e.g., in controlled fusion research.

Background of the invention

Figure 1:
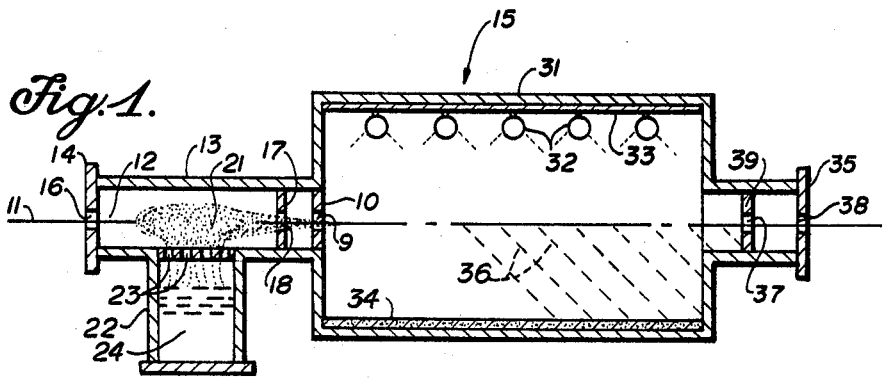

This invention was evolved in the course of, or under, Contract W–7405–ENG–48 with the United States Atomic Energy Commission.

Field of the invention

This invention pertains to a method and apparatus for removing a slow component of a fast particle beam, and more particularly, to a method and apparatus for removing low energy particles or impurity components from an energetic neutral particle beam to form a beam of principally energetic, i.e., high velocity atomic or molecular particles.

Prior art

High energy particle gases or plasmas form the working fluid in thermonuclear reactor technology. One family of magnetic mirror controlled fusion devices, characterized by the "ALICE" device, employs energetic neutral particle beams for the ultimate goal of obtaining a high temperature plasma in a magnetically confined environment. The reasons for using neutral particle beams in a device of the "ALICE" type, together with apparatus and a method for making them, is described in U.S. Patent No. 3,152,959 to C. C. Damm, issued Oct. 13, 1964. Briefly stated, in the operation of such a device, a charged particle beam, usually substantially mono-energetic or of principally high energy, such as about 20 kev. hydrogen ions, is directed into a neutral gas, termed a target gas. Charge exchange interactions occur so that the energetic particles in the beam are neutralized, while some of the target gas is ionized with attendant production of a contaminated energetic neutral particle beam. The neutral particle beam is then injected into the containment magnetic field of a controlled fusion reactor. The charge exchange interactions impart a small amount of momentum to the target gas atoms. The beam leaving the region occupied by the target gas is no longer a selected component beam of high energy, but now has some target gas atoms streaming along with it at an energy usually less than one electron volt. These slow or low energy particles or contaminants, which can be termed thermal energy atoms, very seriously hinder attempts to create a high temperature plasma using the neutral beam. One method and apparatus for removing the thermal energy or contaminant gas atoms is described in U.S. Patent No. 3,319,118 to C. C. Damm, issued May 9, 1967. This method requires the use of a second particle beam directed across the path of the first particle beams so as to filter out the low-velocity components or contaminants.

Summary of the invention

The object of my invention is to provide a simple method and apparatus for removing contaminants, e.g., thermal energy particles, from a particle beam. Although my invention applies to particle beams in general, it is described with reference to a neutralized beam. I have discovered that electromagnetic radiations, i.e., photons of a substantially specific energy, can be used to remove contaminant gas atoms from a neutralized particle beam. Electromagnetic energy which is resonant with the thermal energy target gas atoms in the beam, i.e., of an energy which will be strongly absorbed by them to acquire a directed velocity, is employed. This photonic energy is absorbed from a selective direction, but when re-emitted in a very short time, the photonic energy is unformly distributed in all directions. The net effect is to impart to the thermal energy target gas atoms a component of momentum in the direction of the incident photons. When the photons are directed transverse to the beam, the contaminant gas atoms receive a momentum component transverse to the beam and are accordingly swept transversely and removed therefrom. For example, sodium vapor can be used as the target gas. A sodium arc lamp produces a beam of substantially monochromatic energy suitable for absorption by the sodium vapor thermal energy atoms streaming with the neutralizing beam. In absorbing the transversely directed sodium light photons, contaminant neutral sodium atomic particles are deflected out of the neutral particle beam path, leaving a purified neutral particle beam containing principally high energy neutral particles especially suitable for use as discussed above.

Various objects and features of the invention will be apparent in the following description and accompanying drawings, of which:

Description of the invention

Figure 2:
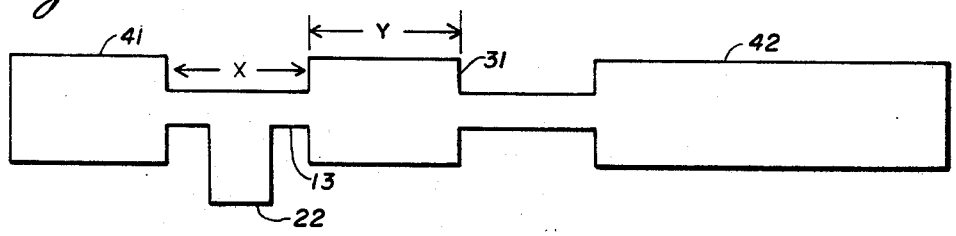

FIGURE 1 is a cross sectional view of a preferred embodiment of an apparatus for producing a purified neutral particle beam in accord with the invention, and FIGURE 2 is a schematic illustration of a fusion reactor arrangement incorporating the apparatus of FIGURE 1.

Description of the preferred embodiment

With reference to FIGURE 1, an energetic charged particle beam 11 from an ion source (not shown) enters a passageway 12 defined by a first section 13 of a tubular housing 15. The housing 15 is provided with a flange 14 at one end for the mounting of a plate including a first beam collimating slit 16. Flange 14 is of a size which can be used for mounting said ion source in a conventional fashion. An annular member 17, disposed transversely in housing 13 proximate the second end, defines a scond beam collimating centrally disposed slit 18. Another annular member 10 forms a third beam collimating slit 9. A target neutral gas 21 is supplied to occupy a volume, traversed by beam 11, in the beam passageway 12 in the first section of the tubular housing 13. A well known method for supplying the target gas is to vaporize the gas from a body of material in the liquid state. A heated conduit portion 22, containing a selected material 24, is connected with the first section 13 of the tubular housing so that vapor transversely enters passageway 12 through the openings 23, which serve as collimators. Sodium has been found suitable as material 24 which, when heated to 400° C., produced a target gas 21. The heated vapor passes through collimating slits 23 across the axis of the first section 13 of the tubular housing through which the charged particle beam 11 passes. The energy of the target gas atoms is usually less than one electron volt, i.e., thermal energy. Some of the target gas atoms become co-mingled with the beam, and stream through the slit in annular member 17 because of a gain in momentum achieved through interactions and because of diffusion.

In selecting a target gas for purposes of the invention, it is important to utilize a material whose atoms have spectra which show intense absorption of selected, nearly monochromatic light over a narrow band of frequencies and weaker absorption intensities at other frequencies. In other words, energy absorption is concentrated over a narrow band of frequencies so that substantially monochromatic radiation in said narrow band will readily excite the target gas atoms. From the inventive standpoint, this principle is rephrased by stating that the target atoms are of a type capable of absorption of a specific amount of electromagnetic radiative energy of substantial monochromaticity sufficient to deflect motion of said gas atoms when the radiation is transverse to said motion. Materials which are especially suitable are those such as sodium, mercury and the like which can be readily vaporized, with which strongly emit and absorb electromagnetic radiation in narrowly defined frequency bands, i.e., at substantially monochromatic frequencies. In general, these materials should also preferably be of low atomic number in order to be readily deflected. These properties are usually found in alkali metals and alkaline earth metals.

In interacting with the neutral target gas 21, the energetic charged particle beam 11, e.g., 20 kev. deutrons, protons, tritons, etc., interchange charges with the target atoms 21 so that the particles of beam 11 become neutralized and some of the gas atoms 21 become charged. Enough target gas atoms 21 must be present to completely neutralize the energetic particles of the beam 11. Accordingly, there emerges from slit 18 a beam including highly energetic neutral particles formed from beam 11 by interaction with gas 21 and a low velocity containment component including low energy neutral gas atoms 21, and possibly some ions thereof.

The fraction of incident beam particles which interact with the target gas atoms is given by the expression: $R = n\sigma x$, where $R$ is the fraction interacting, $n$ is the number of target gas atoms per unit volume, $\sigma$ is the cross section or probability that an interaction will occur, and $x$ is the linear distance which the beam and the denser portions of gas 21 share (see FIGURE 2). In order to insure that the beam is completely neutralized, the density $n$, the distance $x$, or the cross section $\sigma$ may be increased.

In accordance with the invention, an extension section 31 of tubular housing 15 is joined coaxially with the first section 13 thereof, either as an integral or detachable portion, for passage of the contaminated neutral particle beam therethrough. Second housing section 31 is provided with electromagnetic radiation sources 32 mounted near the interior wall surfaces to direct radiation transverse to beam 11. The sources 32 may be arc lamps utilizing the selected target gas as the emitting body, but radio frequency sources could be used with certain target atoms. In particular, sodium vapor may be used as the target gas 21, with monochromatic sodium arc lamps 32 to provide essentially monochromatic electromagnetic radiation or photons which are absorbed by the target gas particles co-mingled with beam 11. The lamps could be used outside the housing 31 if a transparent material is used for the housing. The only requirement is that sources 32 be in radiative transverse communication with the target gas atoms co-mingled with beam 11. Although the lamps are shown all to be on the same side of the beam, this is not necessary, but is preferable. Photons from the lamps 32, upon absorption, deflect the target atoms out of the beam, giving them a component of momentum indicated, for purposes of illustration, by the dashed lines 36.

A radiation absorbing material such as lampblack is applied to the inner surface 34 of second section 31 of tubular housing 15 to prevent reflection of photons from said surface. A pair of apertures 37 and 38, situated along the beam axis as in disk 39 and flange 35, respectively, define an exit for the neutralized beam with target gas particles removed.

The effect whereby atoms selectively absorb radiation of a particular energy and then re-radiate it is known as resonance radiation phenomena. Note that only the thermal energy atoms selectively absorb radiation, and that the atoms of the fast beam do not absorb resonance radiation. These phenomena are analogous to those of a tuning fork which may be started into motion by sound waves corresponding to its characteristic frequency. The fork will then re-radiate after the sound waves have ceased. Even though the first sound waves arrive from one direction, the re-radiation occurs in all directions. Similarly, the target atoms co-mingled with the beam absorb photons arriving unidirectionally from the radiation source 32. The target gas atoms are deflected out of the beam, while at the same time re-radiating the absorbed radiation. The direction of re-radiation is random so that the net effect of absorption of a photon is to impart to the target gas atoms a component of momentum transverse to the beam. A target atom will remain in an excited state for about 10 nanoseconds ($10^{-8}$ seconds). This time is small enough to allow repetitive deflection of target atoms in their mean time of flight through a second section 31 of housing 15 of reasonable length, e.g., 1 meter.

The interior regions of housing 15 are vacuum pumped to allow unimpeded beam travel. See U.S. Patent No. 3,152,959, mentioned above for information on adapting vacuum apparatus of FIGURE 1.

I have described my invention with reference to a neutralized particle beam. Such a beam is useful in a thermonuclear reactor research device 42 in FIGURE 2. An accelerator 41 is connected to the target gas end of housing 15, while the reactor 42 is downstream with respect to the target gas and beam.

It will be understood that, although the specific embodiments of my invention relate to neutralized beams, my invention clearly teaches how to remove slow particles from a fast beam by directing resonant radiation across the beam.

The following example illustrates the important parameters I have mentioned above:

Example

| | |
|---|---|
| Beam current density | 0.1 amperes. |
| Target gas 21 | sodium vapor at 300° C. |
| Mean cross section for absorption of photon by sodium atom | $0.35 \times 10^{-11}$ cm.$^2$. |
| Type of lamp | sodium arc. |
| Length $y$ in FIGURE 2 | one meter. |
| Width of target gas particles co-mingled with beam | 5 cm. |
| Photon power flux through beam (with reflector 33) | .1 watt/cm.$^2$. |
| Deflection in centimeters in beam line of 2 meters | 12 cm. |
| Deflection in radians per interaction | .058. |
| Approximate time of flight of target atom in section 31 | $1.37 \times 10^{-3}$ sec. |
| Approximate number of photon interactions with target gas | 1500. |

While the invention is described with respect to preferred embodiments, it will be apparent to those skilled in the art that numerous variations and modifications may be made within the spirit and scope of the invention. For example, cesium vapor and a cesium arc lamp are a combination which will provide a purified neutral particle beam within the teachings of my invention, as will mercury vapor and mercury arc lamps.

The only limits intended for my invention are those defined in the following claims.

I claim:
1. A method for purifying a particle beam comprising:
   establishing an energetic particle beam having contaminant gas atoms of low relative velocity moving therewith, said gas atoms being of a material absorptive of substantially monochromatic electromagnetic radiation of a specific frequency, and
   directing substantially monochromatic electromagnetic radiation of said specific frequency transversely across said beam, thereby imparting momentum to said gas atoms transverse to said beams deflecting said gas atoms from said beam, yielding a purified beam of energetic particles.

2. The method of claim 1, further defined wherein said electromagnetic energy is of light energy frequency.

3. The method of claim 1, further defined wherein said particle beam is directed through a housing, including collimating means disposed adjacent the path of said beam for stopping said deflected atoms.

4. The method of claim 3, further defined wherein said housing is provided with a radiation absorbing material at the periphery of said housing for extinguishing radiation reaching said periphery.

5. Apparatus for producing a fast purified neutral particle beam from an energetic charged particle beam including a low velocity component or impurity, comprising:
   means defining an elongated beam passageway for transport of said energetic charged particle beam therethrough,
   means for producing a cloud of neutral gas atoms of thermal energy in said passageway to be traversed by said energetic charged particle beam with charge exchange occurring between said thermal energy gas atoms and said charged particles thereby forming a neutral energetic particle beam with gas atoms of thermal energy in motion co-mingled therewith, said neutral gas atoms being of a material absorptive of substantially monochromatic electromagnetic radiation, and
   a source of electromagnetic energy disposed to direct a beam of said substantially monochromatic energy transverse to said energetic netural particle beam comingled with neutral gas atoms of thermal energy upon emergence from said passageway so that the transverse beam of electromagnetic energy deflects said thermal energy gas atoms transversely from said neutral beam, thereby forming a purified energetic neutral particle beam.

6. The apparatus of claim 5, further defined wherein said electromagnetic energy source is light energy.

7. The apparatus of claim 6, further defined wherein a light-absorbing material is disposed distal said light source at the periphery of said housing.

8. The apparatus of claim 6, further defined wherein said housing is provided with a plurality of parallel spaced annular disks perpendicular to said beam, defining apertures centered on the axis of said housing for collimating said beam.

9. Apparatus for removing low velocity component or impurities of a class selectively absorptive of substantially monochromatic electromagnetic radiation from an energetic neutral particle beam comprising:
   an elongated evacuable housing adapted with entrance and exit ports for passage of said energetic charged particle beam longitudinally thetrethrough, and
   a source arranged to direct electromagnetic radiation of a monochromatic characteristic selectively absorbed by said impurities transversely across the volume of said housing traversed by said energetic particle beam to deflect said impurities from said beam so that a purified energetic neutral particle beam emerges from said exit port of said housing.

References Cited
UNITED STATES PATENTS

| | | | |
|---|---|---|---|
| 3,116,433 | 12/1963 | Moncrieff-Yates | 315—111 X |
| 3,152,959 | 10/1964 | Damm | 176—1 |
| 3,319,118 | 5/1967 | Damm | 315—111 |

REUBEN EPSTEIN, *Primary Examiner.*